United States Patent

Katakura et al.

[11] Patent Number: 5,877,918
[45] Date of Patent: Mar. 2, 1999

[54] DISK DRIVING DEVICE WITH HUB FLANGE SECURED BETWEEN YOKE AND DRIVE MAGNET

[75] Inventors: Koichi Katakura; Yutaka Ishizuka, both of Nagano, Japan

[73] Assignee: Kabushiki Kaisha Sankyo Seiki Seisakusho, Nagano, Japan

[21] Appl. No.: 808,175

[22] Filed: Feb. 28, 1997

Related U.S. Application Data

[63] Continuation of Ser. No. 523,056, Sep. 1, 1995, abandoned.

[30] Foreign Application Priority Data

Sep. 2, 1994 [JP] Japan ..................... 6-234376

[51] Int. Cl.$^6$ ..................................... G11B 17/02
[52] U.S. Cl. ........................................ 360/99.08
[58] Field of Search .............. 360/99.04, 99.08, 360/99.09, 99.11, 98.07; 310/42, 46, 66, 67 R, 68 C, 90, 154, 156; 369/266, 269, 270, 271

[56] References Cited

U.S. PATENT DOCUMENTS

| | | | |
|---|---|---|---|
| 4,604,665 | 8/1986 | Müller et al. | 360/99.08 |
| 4,818,907 | 4/1989 | Shirotori | 310/67 R |
| 4,882,643 | 11/1989 | Shirotori | 360/99.08 |
| 5,047,677 | 9/1991 | Mineta et al. | 310/67 R |
| 5,128,819 | 7/1992 | Elsaesser et al. | 360/99.08 |
| 5,325,004 | 6/1994 | Mori et al. | 310/67 R |

FOREIGN PATENT DOCUMENTS 6-36335  5/1994  Japan.

*Primary Examiner*—Stuart S. Levy
*Assistant Examiner*—George J. Letscher
*Attorney, Agent, or Firm*—Sughrue, Mion, Zinn, Macpeak & Seas, PLLC

[57] ABSTRACT

A disk driving device including a hub which rotatably supports a disk with the aid of bearings, a yoke which is fixedly secured to the hub so as to be turned together with the hub, a drive magnet unit which is fixedly mounted on the inner cylindrical surface of a cylindrical portion of the yoke, and a stator core confronted with the drive magnet unit. In the device, the yoke includes a bent portion and the hub includes a flange which protrudes below and outwardly from a disk mounting portion of the hub and which has an upper surface having an inner diameter substantially equal to an inner diameter of the bent portion of the yoke. The flange is located below a disk mounting portion, and the flange is fixedly held between the inner surface of the bent portion of the yoke and the upper end face of the drive magnet unit.

21 Claims, 2 Drawing Sheets

DISK DRIVING DEVICE WITH HUB FLANGE SECURED BETWEEN YOKE AND DRIVE MAGNET

This is a Continuation of application Ser. No. 08/523,056 filed Sep. 1, 1995 now abandoned.

FIELD OF THE INVENTION

This invention relates to a disk driving device which is applicable to a hard disk driving device or the like, and more particularly to the structure of the device which fixedly secures the yoke to the hub in the disk driving device.

BACKGROUND OF THE INVENTION

A conventional disk driving device applied to a hard disk driving device is shown in FIG. 3. A cup-shaped frame 5 includes a cylindrical bearing holder 5a at the center thereof. A flange-shaped mounting portion 5c is radially outwardly extended from the upper end of a cylindrical wall 5b of the frame. And a stator core 6 is mounted on the outer cylindrical surface of the bearing holder 5a. The stator core 6 is formed by stacking a plurality of core plates made of magnetic substance, and has a plurality of protruded poles which are radially outwardly extended from the center thereof. A drive coil assembly 7 is wound on the protruded poles of the stator core 6.

Upper and lower ball bearings 1 and 1' are fixed in the bearing holder 5a of the frame 5 in such a manner that their outer races are fixed to the inner cylindrical surface of the bearing holder 5a, and their inner races are fixed to the central shaft 2b of a hub 2 on which for instance a magnetic disk is placed. The hub 2 is cylindrical, and its outer peripheral portion is stepped downwardly, thus being formed into a disk mounting portion 2d. The upper surface of the latter 2d includes an annular disk mounting surface 2c which is protruded slightly upwardly. The central portion of the hub 2 is protruded downwardly, thus forming the aforementioned central shaft 2b. The shaft 2b is fixed to the inner races of the upper and lower ball bearings 1 and 1'. That is, the hub 1 is rotatably mounted on the frame 5 through the ball bearings 1 and 1'. The hub 2 is made of a non-magnetic material such as for instance aluminum alloy.

A yoke 3 is fixedly secured to the outer periphery of the lower surface of the disk mounting portion 2d. The yoke 3 includes a cylindrical portion 3a, and a bent portion 3b which is radially inwardly extended from the upper end of the cylindrical portion 3a. A protrusion 2e extended from the lower surface of the disk mounting portion 2d of the hub 2 is caulked over the bent portion 3b, so that the yoke 3 is fixedly secured to the hub 2. An annular drive magnet unit 4 is fixedly mounted on the inner cylindrical surface of the cylindrical portion 3a of the yoke 3 in such a manner that the inner cylindrical surface of the magnet unit 4 is confronted through a predetermined gap with the protruded poles of the stator core 6. Hence, by applying current to the drive coil assembly 7 wound on the protruded poles of the stator core 6, the drive magnet unit 4 is energized, so that the yoke 3 and the hub 2 are rotated.

In the above-described disk driving device, the yoke is secured to the hub by caulking. However, the method of securing the yoke to the hub is not always limited thereto or thereby. For instance, methods as shown in FIGS. 4(a) and 4(b) may be employed. In the method shown in FIG. 4(a), the outer cylindrical surface G of a disk-shaped hub 2, and the lower surface H of the outer peripheral portion of the hub 2 are joined through adhesive to the inner cylindrical surface of the upper end portion of a yoke 3' and the upper end face of the drive magnet unit 4, respectively. The method has been disclosed in Japanese Utility Model Publication No. Hei. 5-91167.

In the method shown in FIG. 4(b), a protrusion 2e is formed on the lower surface of the hub 2, and the peripheral portion I of the lower surface of the hub 2 which surrounds the protrusion 2e and the outer cylindrical surface J of the protrusion 2e are joined through adhesive to the inner periphery of the upper surface of the bent portion 3b of the yoke 3 and the inner cylindrical surface of the head portion 3b, respectively. The method has been disclosed in Japanese Utility Model Publication No. Hei. 6-38060.

In the conventional device shown in FIG. 3, When the yoke 3 is fixedly secured to the hub 2 by caulking, the yoke 3 is positively secured to the hub 2, so that the yoke 3 never comes off the hub 2. However, the hub 2 is unavoidably strained during caulking, so that its disk mounting surface 2c is somewhat deformed. Hence, when the hub 2 is turned with a disk mounted on the annular disk mounting surface 2c thus deformed, the disk is oscillated axially, that is, a so-called "planar oscillation" occurs. In order to eliminate this difficulty, it is necessary to finish the annular disk mounting surface 2c by the lathe processing or the like after the yoke 3 and the drive magnet unit 4 are secured to the hub 2.

On the other hand, in each of the methods shown in FIGS. 4(a) and 4(b), the yoke is bonded to the hub with adhesive. Hence, the methods will not adversely affect the disk mounting surface such as the aforementioned method, that is, by caulking. However, in each of the methods, the bonding surfaces are so small that the yoke is not sufficiently fastened to the hub. Hence, if an excessively great impact is applied to the device, the yoke may come off the hub, thus damaging other components.

SUMMARY OF THE INVENTION

Accordingly, an object of the invention is to eliminate the above-described difficulties accompanying a conventional disk driving device. More specifically, an object of the invention is to provide a disk driving device in which the yoke is firmly secured to the hub with the disk mounting surface of the hub being maintained unchanged.

To achieve the above object, the disk driving device of the present imvention includes the following parts, that is, a hub, a yoke, a driving magnet unit and a stator core.

The hub is rotatably supported by a bearing and a disk is mounted on the hub. The yoke is made of a magnetic material which is fixedly secured to the hub so that the yoke is turned together with the hub. The drive magnet unit is fixed on the inner cylindrical surface of a cylindrical portion of the hub, and a stator core is confronted with the drive magnet unit.

the hub includes a flange along the outer periphery thereof which has a diameter that is slightly smaller than the inside diameter of a cylindrical portion of the yoke and which is located below a disk mounting portion. Further, the flange is fixedly held between the inner surface of a bent portion of the yoke and the upper end face of the drive magnet unit.

DETAILED DESCRIPTION OF THE PREFERRED EMBODIMENTS

The preferred embodiments of the invention will be described with reference to the accompanying drawings.

1st Embodiment

Figure 1:
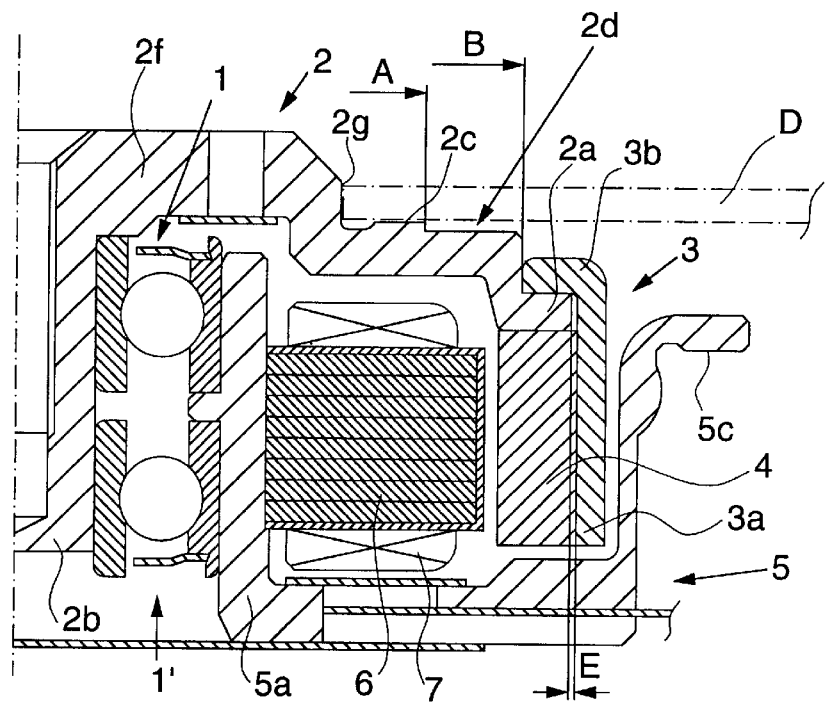
FIG. 1 is a sectional view showing a first embodiment of a disk driving device.
Figure 3:
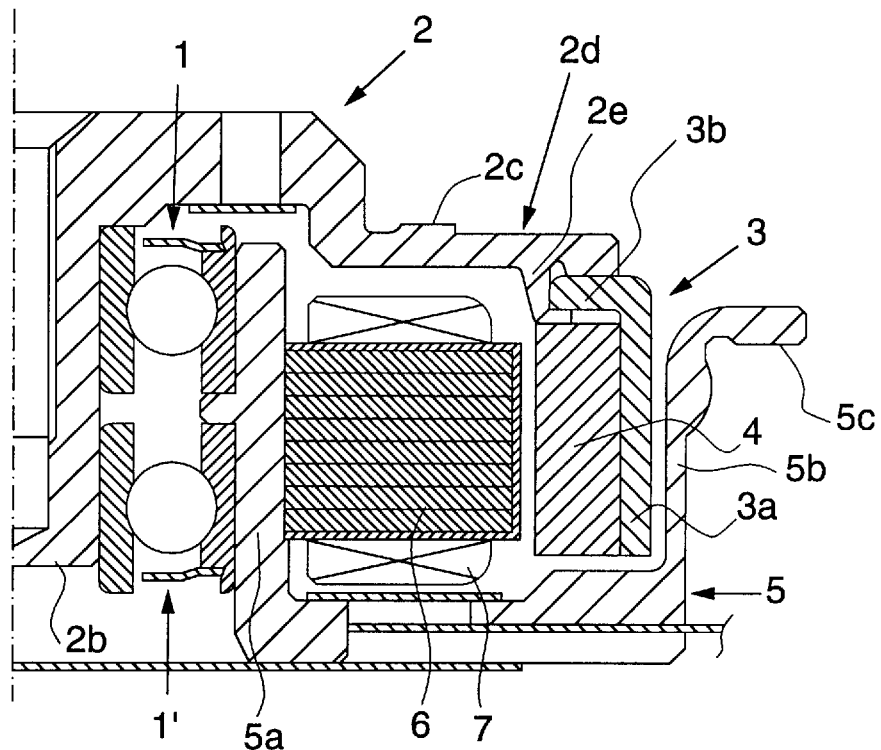
FIG. 3 is a sectional view showing an example of a conventional disk driving device.
Figure 4:
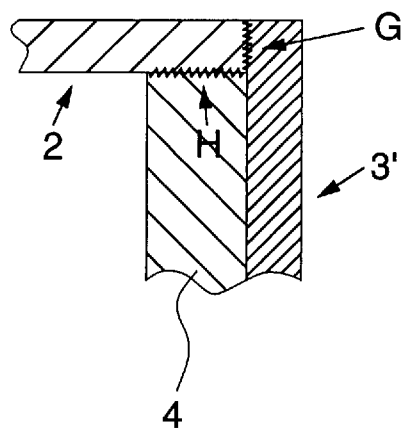
FIGS. 4a and 4b are sectional views showing an example of the conventional disk driving device.
Figure 4:
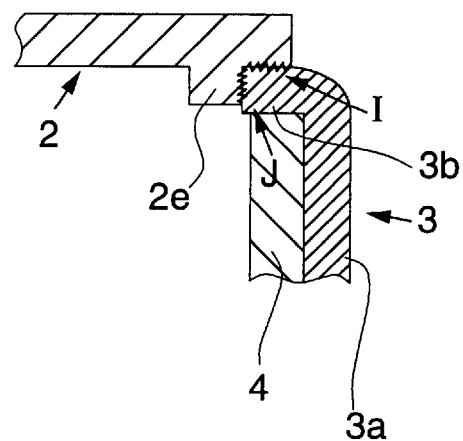

FIG. 1 shows a first embodiment of a disk driving device. The disk driving device is substantially equal in the fundamental structure to the above-described conventional device. Therefore, the device will be described, with emphasis placed on its structure which fixes the yoke to the hub, with reference to FIG. 1, in which parts functionally common with the conventional disk driving device. shown in FIG. 3 are therefore designated by the same reference numerals or characters.

As shown in FIG. 1, a hub 2 made of aluminum alloy or the like comprises a shaft 2b at the center which is extended downwardly, a disk-shaped base portion 2f which is radially outwardly extended from the base end portion of the shaft 2b, a disk mounting portion 2d which is stepped downwardly from and extended radially outwardly from the outer periphery of the base portion 2f, and an annular flange 2a which is stepped downwardly from and extended radially outwardly from the outer periphery of the disk mounting portion 2d.

The shaft 2b is rotatably supported by ball bearings 1 and 1'. The outer cylindrical surface 2g of the base portion 2f serves as a guide when a disk D with a central hole is mounted on the hub 2 in such a manner that the central hole is engaged with the hub 2. The upper surface of the disk mounting portion 2d includes an annular disk mounting surface 2c which is protruded slightly upwardly. The disk D, such as a hard disk, is placed on the annular disk mounting surface 2c. The flange 2a is located below and around the annular disk mounting portion 2d. Hence, as seen from FIG. 1, the diameter of the inner periphery of the flange 2a, namely, a yoke mounting diameter B is larger than the outside diameter A of the annular disk mounting surface 2c.

A yoke 3 made of magnetic material is secured to the flange 2a of the hub 2. The yoke 3 includes a cylindrical portion 3a, and an annular bent portion 3b which is radially inwardly extended from the upper end of the cylindrical portion 3a. An annular drive magnet unit 4 is fixedly mounted on the inner cylindrical surface of the cylindrical portion 3a of the yoke 3.

The yoke 3 is joined to the hub 2 as follows. That is, the inner surface of the bent portion 3b is bonded to the upper surface of the flange 2a of the hub 2, and the lower surface of the flange 2a is bonded to the upper end face of the drive magnet unit 4. In other words, the yoke 3 is fixedly secured to the hub 2 in such a manner that its flange 2a is held between the lower surface of the bent portion 3b and the upper end face of the drive magnet unit 4. In this case, in order that the upper surface of the bent portion 3b of the yoke 3 may not obstruct the disk mounting operation, the yoke must be located below the annular disk mounting portion 2d.

The bent portion 3b of the yoke 3 is formed by plastic working. Hence, the intersection of the lower surface of the bent portion 3b and the inner cylindrical surface of the cylindrical portion 3a is curved in section with a small curvature, not forming right angles. Hence, the outer cylindrical surface of the flange 2a of the hub 2 will never abut against the inner cylindrical surface of the cylindrical portion 3a of the yoke 3, that is, a gap E is formed between those surfaces. By filling the gap E with the adhesive, the yoke 3 is more firmly bonded to the hub 2.

As was described above, in the first embodiment, the yoke 3 is fixedly bonded to the hub 2 with the flange 2a held between the lower surface of the bent portion 3b and the upper end face of the drive magnet unit 4. In this case, no caulking technique is used, and therefore the joining of the yoke 3 to the hub 2 will never deform the disk mounting portion 2d, and accordingly, the device is free from the difficulty that the disk D is oscillated when turned. In addition, in the device, the bonding area is sufficiently large, including the upper end face of the drive magnet unit 4, the lower surface of the flange 2a, the lower surface of the bent portion 3b of the yoke 3, and the upper surface of the flange 2a. This means that the yoke 3 is more positively secured to the hub 2.

Even if the upper end face of the drive magnet unit 4 and the lower surface of the flange 2a are separated from each other while the lower surface of the bent portion 3b of the yoke and the upper surface of the flange 2a are also separated from each other, the yoke 3 never comes off the hub 2 because the drive magnet unit 4 is fixedly secured to the yoke 3. That is, since the drive magnet unit 4 is fixedly secured to the yoke 3, the flange 2a is still held between the lower surface of the bent portion 3b and the upper end face of the drive magnet 4, so that the yoke 3 never comes off the hub 2.

2nd Embodiment

The above-described disk driving device is of the rotary shaft type. However, the above-described structure for fixing the yoke to the hub may be also effectively applied to a disk driving device of the stationary shaft type.

Figure 2:
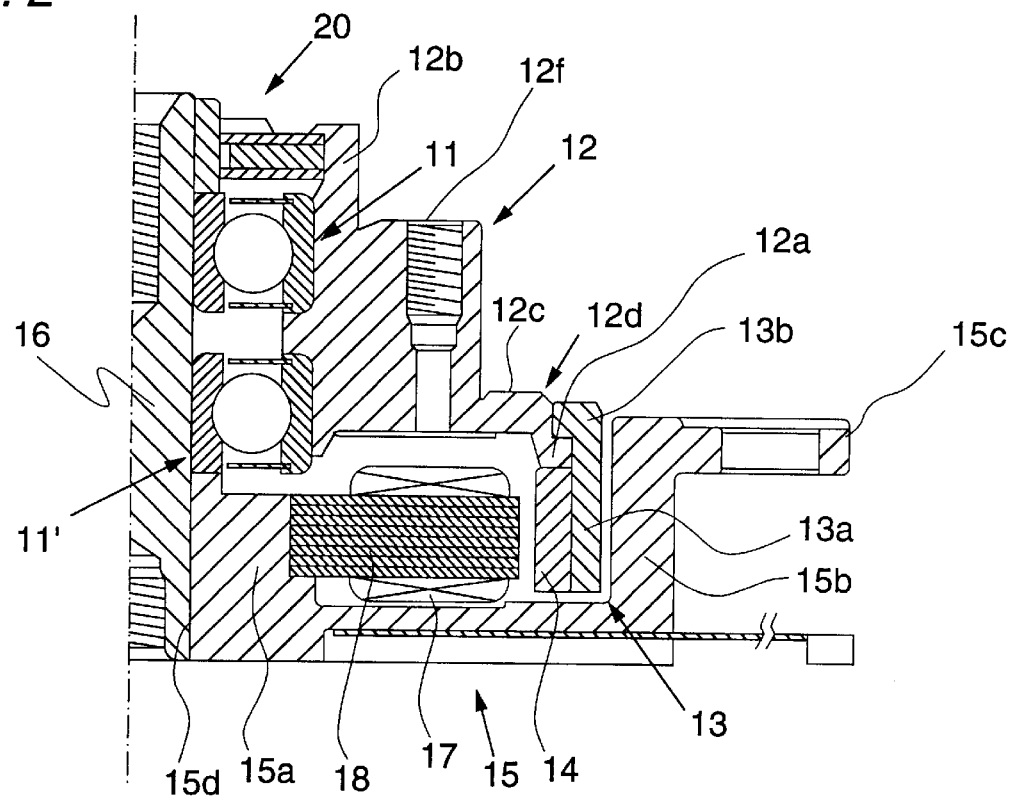
FIG. 2 is a sectional view showing a second embodiment of the disk driving device.

Next, a second embodiment of the disk driving device, namely, a disk driving device of the stationary shaft type, will be described with reference to FIG. 2. In FIG. 2, a cup-shaped frame 15 has a protrusion 15a at the center thereof. The protrusion 15a has a shaft hole 15d along the central axis thereof. A shaft 16 is fixed to the shaft hole 15d by press-fit. The frame 15 includes a cylindrical wall 15b, and an annular flange 15c which is radially outwardly extended from the upper end of the cylindrical wall 15b. The flange 15c is mounted on a device body.

A stator core 18 is mounted on the outer cylindrical surface of the protrusion 15a. The stator core 18 is a stack of core plates of magnetic material, and has a plurality of protruded poles which are radially outwardly protruded from the center thereof. A drive coil assembly 17 is wound on the protruded poles of the stator core 18.

The inner races of ball bearings 11 and 11' are fixed on the outer cylindrical surface of the central shaft 16 which is extended upwardly from the protrusion 15a of the frame 15. A hub 12 on which for instance a magnetic disk is placed, is fixed on the outer races of the ball bearings 11 and 11', so that the hub 12 is rotatably supported through the ball bearings 11 and 11' by the frame 15.

The hub 12 includes a cylindrical base portion 12f, a flange-shaped disk mounting portion 12d which is radially outwardly extended from the lower end of the base portion 12f, and a cylindrical protrusion 12b formed on the top of the base portion 12f. A magnetic fluid seal 20 is fitted to the inner cylindrical surface of the cylindrical protrusion 12b, so as to prevent dust particles formed by the ball bearings 11 and 11' from leaking outside. The upper surface of the disk mounting portion 12d includes an annular disk mounting surface 12c. The hub 12 further includes an annular flange 12a which is stepped downwardly from and radially outwardly extended from the outer periphery of the disk mounting portion 12d.

A yoke 13 made of magnetic material is coupled to the flange 12a of the hub 12. The yoke 13 includes a cylindrical portion 13a and a bent portion 13b. The lower surface of the bent portion 13b is fixedly bonded to the upper surface of the flange 12a. An annular drive magnet unit 14 is fixedly mounted on the inner cylindrical surface of the cylindrical portion 13a, and the upper end face of the drive magnet 14 is fixedly bonded to the lower surface of the flange 12a. In other words, the yoke 13 is fixedly secured to the hub 12 in such a manner that its flange 12a is held between the lower surface of the bent portion 13b and the upper end face of the drive magnet unit 14. In this case, in order that the upper surface of the bent portion 13b of the yoke 13 may not obstruct the disk mounting operation, the yoke 13 must be located below the annular disk mounting portion 12d.

The drive magnet unit 14 fixedly mounted on the cylindrical portion 13a of the yoke 13 is confronted through a predetermined gap with the protruded poles of the stator core 18. Hence, by applying current to the drive coil assembly 17 wound on the protruded poles of the stator core 18, the drive magnet unit 14 is energized, and the hub 12 is rotated.

In the above-described disk driving device of stationary shaft type, similarly as in the first embodiment, the yoke 13 is bonded to the hub 12 with the flange 12a of the hub 12 held between the lower surface of the bent portion 13b of the yoke 13 and the upper end face of the drive magnet unit 14. That is, no caulking technique is used, and therefore the joining of the yoke 13 to the hub 12 never deforms the disk mounting portion 12d and the annular disk mounting surface 12c. Hence, the device is free from the difficulty that the disk is oscillated when turned. In addition, the yoke is bonded to the hub with the adhesive between the upper end face of the drive magnet unit 14 and the lower surface of the flange 12a and with the adhesive between the lower surface of the bent portion 13b of the yoke 13 and the upper surface of the flange 12a. That is, in the device, the bonding area is sufficiently large. This means that the yoke 13 is more positively secured to the hub 12.

Even if the upper end face of the drive magnet unit 14 and the lower surface of the flange 12a are separated from each other while the lower surface of the bent portion 13b of the yoke 13 and the upper surface of the flange 12a are also separated from each other, the yoke 13 never comes off the hub 12. That is, in this case, since the drive magnet unit 14 is fixedly secured to the yoke 13, the flange 12a is still held between the lower surface of the bent portion 13b and the upper end face of the drive magnet unit 14, so that the yoke 13 never comes off the hub 12.

While the invention has been described with reference to its preferred embodiments, it should be noted that the invention is not limited thereto or thereby, and it will be obvious to those skilled in the art that various changes and modifications may be made therein without departing from the invention. For instance, in the above-described embodiments, ball bearings are employed. However, they may be replaced with dynamic pressure bearings or metal bearings.

In order to positively bond the bent portion 3b of the yoke 3 and the drive magnet unit 4 to the flange 2a of the hub, it is most preferable to apply the adhesive to each of the bonding surfaces which are confronted with each other. However, it is not always required to do so, that is, the adhesive may be applied to only one of the bonding surfaces. That is, even if the adhesive is applied to only one of the bonding surfaces, the hub 2 and the yoke 3 will never be separated from each other, because the flange 2a is held between the lower surface of the bent portion 3b of the yoke 3 and the upper end face of the drive magnet unit 4.

In the above-described embodiments, the adhesive is applied to the bonding surfaces. However, pressure-sensitive adhesive double coated tape may be employed.

In the disk driving device of rotary shaft type shown in FIG. 1, the shaft 2b is integral with the hub 2. However, the device may be so modified that a hole is formed in the hub 2 at the center thereof, and a shaft is fixed in the hole thus formed.

In the disk driving device of stationary shaft type shown in FIG. 2, the shaft 16 and the frame 15 are provided as separate components. However, they may be provided as one component.

In the disk driving device of the present invention, a hub has the flange, and the outside diameter of the flange is slightly smaller than the inside diameter of the cylindrical portion of the yoke, and the flange is stepped downwardly from the disk mounting portion. The yoke is fixedly bonded to the hub with the flange held between the lower surface of the bent portion of the yoke and the upper end face of the drive magnet unit. Hence, the joining of the yoke to the hub will never adversely affect the disk mounting portion, for instance, the disk mounting portion will never be deformed. In addition, in the device, the bonding area is larger than in the conventional device, so that the yoke is more positively secured to the hub. That is, in the device of the invention the yoke stays affixed to the hub. Even if the adhesion of the flange to the yoke is deteriorated, the flange is still held between the drive magnet unit fixedly mounted on the yoke and the bent portion of the yoke. Hence, the problem of the yoke coming off the hub and damaging other components is not present in the invention. That is, the device of the invention is high in reliability.

What is claimed is:

1. A disk driving device comprising:
    a hub on which a disk is mounted, said hub being rotatably supported by a bearing, said hub including a disk mounting portion extended from a rotation center of said hub in the radial direction and a flange along the outer periphery of said disk mounting portion, said flange being stepped downwardly from said disk mounting portion and protruding outwardly from the outer periphery of the disk mounting portion in the radial direction, an outer diameter of said flange being larger than an outer diameter of said disk mounting portion;
    a yoke comprising a magnetic material, said yoke including a cylindrical portion and a bent portion radially and inwardly extended from an upper end of said cylindrical portion, said yoke being fixed to said hub so as to rotate together with said hub, an upper portion of said flange of said hub having an inner diameter substantially equal to an inner diameter of said bent portion of said yoke;
    a drive magnet unit fixed on an inner cylindrical surface of said cylindrical portion of said yoke; and
    a stator core confronted with said drive magnet unit,
    wherein said yoke is able to be dropped from a direction above from which the disk is mounted onto said flange so as to be fixed to said hub while said bent portion of said yoke is joined to said upper surface of said flange.

2. The disk driving device as claimed in claim 1, wherein at least one of a first adhesive area between the lower surface of said bent portion and the upper surface of said flange, and a second adhesive area between a lower surface of said flange and the upper end face of said drive magnet unit, is fixedly secured with an adhesive.

3. A disk driving device as claimed in claim 2, wherein a gap is formed between the outer cylindrical surface of said flange of said hub and the inner cylindrical surface of said cylindrical portion of said yoke, and is filled with an adhesive.

4. The disk driving device as claimed in claim 1, wherein a gap is formed between the outer cylindrical surface of said flange of said hub and the inner cylindrical surface of said cylindrical portion of said yoke, and is filled with an adhesive.

5. The disk drive as claimed in claim 1, wherein an inner diameter of said bent portion of said yoke is larger than the outer diameter of said disk mounting portion and substantially equal to an inner diameter of said flange.

6. The disk drive as claimed in claim 1, wherein an upper end face of said drive magnet unit is fixed to a lower surface of said flange.

7. A disk driving device as claimed in claim 1, wherein said bent portion of said yoke directly contacts an upper surface of said flange closest to a lower surface of said disk.

8. A disk driving device comprising:
   a frame having a cylindrical bearing holder;
   a hub on which a disk is mounted, said hub being provided with a shaft at the center thereof;
   a bearing held by said bearing holder to rotatably support said shaft;
   a yoke comprising a magnetic material, said yoke including a cylindrical portion and a bent portion, said bent portion extending radially and inwardly from an upper end of said cylindrical portion, said yoke being fixed to said hub so as to rotate together with said hub,
   a drive magnet unit fixed on an lower cylindrical surface of said cylindrical portion of said yoke; and
   a stator core fixed on said frame so as to confront said drive magnet unit,
   wherein said hub comprises a disk mounting portion extended from a rotation center of said hub in the radial direction and a flange disposed at an outer periphery of said disk mounting portion, said flange having an upper surface having an inner diameter substantially equal to an inner diameter of said bent portion of said yoke, said flange being stepped downwardly from said disk mounting portion, protruding outwardly from the outer periphery of the disk mounting portion in the radial direction, an outer diameter of said flange being larger than an outer diameter of said disk mounting portion, and said yoke is able to be dropped from a direction above from which the disk is mounted onto said flange so as to be fixed to said hub while said bent portion of said yoke is joined to said upper surface of said flange.

9. A disk driving device as claimed in claim 8, wherein at least one of a first adhesive area between the lower surface of said bent portion and an upper surface of said flange, and a second adhesive area between a lower surface of said flange and the upper end face of said drive magnet unit, is fixedly secured with an adhesive.

10. A disk driving device as claimed in claim 9, wherein a gap is formed between the outer cylindrical surface of said flange of said hub and the inner cylindrical surface of said cylindrical portion of said yoke, and is filled with an adhesive.

11. A disk driving device as claimed in claim 8, wherein a gap is formed between the outer cylindrical surface of said flange of said hub and the inner cylindrical surface of said cylindrical portion of said yoke, and is filled with an adhesive.

12. The disk drive as claimed in claim 8, wherein an inner diameter of said bent portion of said yoke is larger than the outer diameter of said disk mounting portion and substantially equal to an inner diameter of said flange.

13. The disk drive as claimed in claim 8, wherein an upper end face of said drive magnet unit is fixed to a lower surface of said flange.

14. A disk driving device as claimed in claim 8, wherein said bent portion of said yoke directly contacts an upper surface of said flange closest to a lower surface of said disk.

15. A disk driving device comprising:
   a frame;
   a shaft provided at the center of said frame;
   a bearing fixed on said shaft;
   a hub on which a disk is mounted, said hub being rotatably supported by said bearing;
   a yoke comprising a magnetic material, said yoke including a cylindrical portion and a bent portion, said bent portion extending radially and inwardly from an upper end of said cylindrical portion, said yoke being fixed to said hub so as to rotate together with said hub,
   a drive magnet unit fixedly mounted on an inner cylindrical surface of said cylindrical portion of said yoke; and
   a stator core fixedly secured to said frame so as to confront said drive magnet unit,
   wherein said hub comprises a disk mounting portion extended from a rotation center of said hub in the radial direction and a flange disposed at an outer periphery of said disk mounting portion, said flange having an upper surface having an inner diameter substantially equal to an inner diameter of said bent portion of said yoke, said flange being stepped downwardly from said disk mounting portion, protruding outwardly from the outer periphery of the disk mounting portion in the radial direction, an outer diameter of said flange being larger than an outer diameter of said disk mounting portion, and said yoke is able to be dropped from a direction above from which the disk is mounted onto said flange so as to be fixed to said hub while said bent portion of said yoke is joined to said upper surface of said flange.

16. A disk driving device as claimed in claim 15, wherein at least one of a first adhesive area between the lower surface of said bent portion and an upper surface of said flange, and a second adhesive area between a lower surface of said flange and the upper end face of said drive magnet unit, is fixedly secured with an adhesive.

17. A disk driving device as claimed in claim 16, wherein a gap is formed between the outer cylindrical surface of said flange of said hub and the lower cylindrical surface of said cylindrical portion of said yoke, and is filled with an adhesive.

18. A disk driving device as claimed in claim 15, wherein a gap is formed between the outer cylindrical surface of said flange of said hub and the inner cylindrical surface of said cylindrical portion of said yoke, and is filled with an adhesive.

19. The disk drive as claimed in claim 15, wherein an inner diameter of said bent portion of said yoke is larger than the outer diameter of said disk mounting portion and substantially equal to an inner diameter of said flange.

20. The disk drive as claimed in claim 15, wherein an upper end face of said drive magnet unit is fixed to a lower surface of said flange.

21. A disk driving device as claimed in claim 15, wherein said bent portion of said yoke directly contacts an upper surface of said flange closest to a lower surface of said disk.

\* \* \* \* \*